June 11, 1957     M. S. KAVANAUGH     2,795,058
TACHISTOSCOPE
Filed Jan. 23, 1953
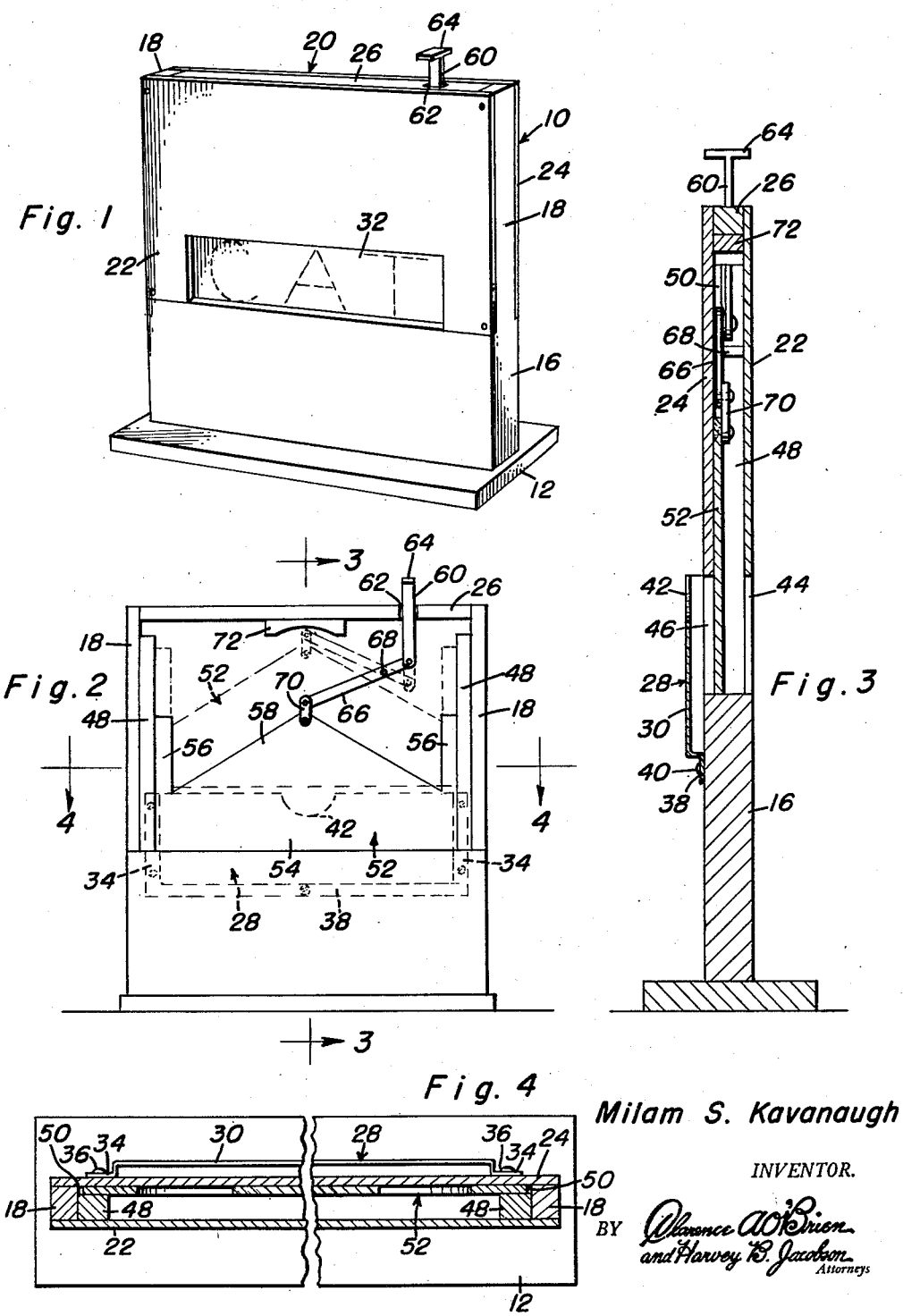
Milam S. Kavanaugh
INVENTOR.

United States Patent Office 2,795,058
Patented June 11, 1957

2,795,058

TACHISTOSCOPE

Milam S. Kavanaugh, College Station, Tex.

Application January 23, 1953, Serial No. 332,846

2 Claims. (Cl. 35—35)

This invention relates in general to educational devices, and more specifically to a device for displaying cards for a short period of time.

For years, teachers have known that visual stimuli of a short duration under controlled motivation have a favorable effect on the learning process. At the present time, teachers utilize two techniques in taking advantage of this psychological principle. The two techniques include the so-called flash cards and an electric device. The electric device, while being very useful, is not used in many schools inasmuch as it is an expensive and delicate instrument. The flash cards are disadvantageous inasmuch as the child's attention is distracted by the teacher holding the flash cards, there is no way to accurately control the time exposure, and the cards lack "eye appeal" in addition to having too much motion in the turning and exchanging of the flash cards. It is therefore the primary object of this invention to provide an improved educational device for facilitating the displaying of cards for a short period of time.

Another object of this invention is to provide an improved device for displaying cards, said device being provided with shutter means which are selectively movable in and out of alignment with cards being held by the device so as to facilitate the teaching of children.

Another object of this invention is to provide an improved device for flashing cards which is formed of readily obtainable materials and is simple in construction whereby the same is economically feasible.

A further object of this invention is to provide an improved device for flashing cards, said device being relatively steady and permitting the interchanging of cards without distracting the attention of the children watching the same, said device also being provided with easily operated means for actuating the shutter means of the device to permit the displaying of cards held therein.

These together with other objects and advantages which will become subsequently apparent reside in the details of construction and operation as more fully hereinafter described and claimed, reference being had to the accompanying drawings forming a part hereof, wherein like reference numerals refer to like parts throughout, and in which:

Figure 1 is a perspective view of the educational device which is the subject of this invention and shows shutter means of the same in an elevated position so as to display a card held by the educational device;

Figure 2 is a front elevational view of the educational device of Figure 1 with a front panel thereof removed in order to clearly disclose the relationship of a shutter disposed therein and the means for selectively elevating said shutter;

Figure 3 is an enlarged transverse vertical sectional view taken substantially upon the plane indicated by the section line 3—3 of Figure 2 and shows the relationship of various elements of the shutter mechanism and the cross-section of the card holder; and Figure 4 is an enlarged transverse horizontal sectional view taken substantially upon the plane indicated by the section line 4—4 of Figure 2 and shows the general relationship of the card holder to the remainder of the educational device, the central portion of the educational device being omitted.

Referring now to the drawings in detail, it is seen that there is illustrated the educational device, which is the subject of this invention, the educational device being referred to in general by the reference numeral 10. The educational device 10 includes a generally rectangular base 12 which has disposed centrally thereof and extending vertically therefrom a block 16. The block 16 has the upper central portion thereof removed to present a pair of spaced parallel upstanding legs 18. The space between the legs 18 is enclosed to form a hollow housing which is referred to in general by the reference numeral 20, the legs 18 forming ends of the housing.

The housing 20 is formed by a front panel 22 which is removably secured to the front of the legs 18 and seated in a recess therein so as to be flush with the front portion of the block 16. The housing 20 also includes a similar rear panel 24 which is secured to the rear of the legs 18. Extending between the upper ends of the legs 18 is a top wall forming member 26.

As is best illustrated in Figure 3 and 4, secured to the rear of the block 16 is a card holder 28. The card holder 28 includes a portion 30 in spaced parallel relation to the rear of the block 16 so as to facilitate engagement of a card 32 within the card holder 28. The card holder 28 also includes integral side flanges 34 which are secured to the rear surface of the block 16 and lower portions of the rear panel 24 by suitable fasteners 36. The card holder 28 further includes a lower flange 38 secured to the rear face of the block 16 by suitable fasteners 40. The flanges 34 and 38 lie in a common plane and form the peripheral edges of the card holder 28.

It is intended that a card 32 be placed within the card holder 28 with indicia on the front face thereof. In order to facilitate the removal of cards from the card holder 28, the portion 30 thereof is provided with a semi-circular recess 42 in the upper edge thereof whereby a card may be conveniently grasped.

In order that a card 32 disposed within the card holder 28 may be conveniently viewed, the front panel 22 is provided with an enlarged, generally rectangular opening 44 which is in alignment with both an enlarged opening 46 in the rear panel 26 and the upper portion of the card holder 28. It will be understood that the indicia placed on the card 32 will be so positioned so as to be aligned with the openings 44 and 46 when the card is disposed within the card holder 28.

Secured to the inner faces of the legs 18 and abutting the rear face of the front panel 22 are vertically extending members 48. The members 48 have their rear faces spaced from the front surface of the rear panel 24 to form aligned guideways 50.

Mounted within the aligned guideways 50 for vertical movement is a shutter which is referred to in general by the reference numeral 52. The shutter 52 includes a generally rectangular lower portion 54 which has extending vertically from the ends thereof vertical legs 56, the vertical legs 56 and end portions of the lower portion 54 being disposed within the guideways 50 for guiding the shutter 52 during vertical movement thereof. The shutter 52 also includes a centrally disposed triangular portion 58 which extends vertically from the lower portion 54.

In order that the shutter 52 may be conveniently elevated to permit viewing of a card through the aligned openings 44 and 46, there is provided actuating means which includes a vertically disposed operating lever 60. The operating lever 60 passes through an aperture 62 in the top wall forming member 26 and the upper end thereof is in the form of a transversely extending finger engageable portion 64.

The lower end of the operating lever 60 is pivotally connected to an outer end of a link 66. The link 66 is mounted for pivotal movement on a pivot pin 68 which extends between and is supported by the front panel 22 and the rear panel 24. The pivot pin 68 is positioned adjacent the operating lever end of the link 66.

The other end of the link 66 is pivotally connected to an upper end of a short link 70 which has its lower end pivotally connected to the triangular portion 58 of the shutter adjacent the apex of the same.

It will be seen that when the operating lever 60 is moved downwardly, the link 66 is pivoted about the pivot pin 68 to elevate the shutter 52. In order that the upward movement of the shutter 52 may be controlled, there is secured to the underside of the top wall forming member 26 a stop 72 which is engaged by the upper end of the link 70.

When the educational device 10 is being utilized by a teacher, a desired card 32 is placed within the card holder 28 while the educational device 10 is conveniently displayed for observation by all of the children of a class. Then, the operating lever 60 is depressed with the result that the shutter 52 moves upwardly to expose the indicia on the card 32. After a predetermined length of time, the operating lever 60 is released to permit the shutter 52 to return to its normal position to be disposed in front of the card 32.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A tachistoscopic device comprising a hollow housing, said housing having a front wall, a rear wall spaced rearwardly of said front wall, and a frame connecting together said front and rear walls in spaced relation, aligned enlarged openings in said front and rear walls, a card holder secured to said rear wall exteriorly of said housing in alignment with said enlarged openings whereby a card carried by said card holder may be viewed through said enlarged openings, a shutter mounted within said housing, a stop member in said housing, said shutter normally being gravity urged towards and resting upon said stop member in alignment with said openings and preventing the viewing through said openings, guide means within said housing for guiding said shutter for free vertical movement, and actuating means connected to said shutter for selectively temporarily raising said shutter in said housing above said openings for momentarily viewing the card through said openings.

2. The tachistoscopic device of claim 1, wherein said actuating means includes an operating lever which extends vertically above said housing for actuation by an operator of the tachistoscopic device.

References Cited in the file of this patent

UNITED STATES PATENTS

| 346,656 | Hopkins | Aug. 3, 1886 |
| 1,385,623 | Kellogg | July 26, 1921 |
| 1,847,815 | Church | Mar. 1, 1932 |
| 2,266,798 | Peck | Dec. 23, 1941 |
| 2,628,435 | Minninger et al. | Feb. 17, 1953 |
| 2,647,329 | Bloch et al. | Aug. 4, 1953 |
| 2,723,466 | Ott | Nov. 15, 1955 |
| 2,724,911 | Schuman | Nov. 29, 1955 |

FOREIGN PATENTS

| 177,489 | Great Britain | Jan. 11, 1922 |
| 271,394 | Switzerland | Oct. 31, 1950 |